United States Patent [19]
Haft et al.

[11] 4,262,548
[45] Apr. 21, 1981

[54] FLYWHEEL OVERBALANCE

[75] Inventors: Gerald Haft; Otto H. Scharpf, both of Brookfield, Wis.

[73] Assignee: Outboard Marine Corporation, Waukegan, Ill.

[21] Appl. No.: 36,761

[22] Filed: May 7, 1979

[51] Int. Cl.³ .................. F16H 21/22; F02B 75/06
[52] U.S. Cl. ........................................ 74/44; 56/17.5; 74/604; 123/192 B
[58] Field of Search ...................... 56/10.5, 11.5, 17.5; 74/44, 573, 574, 603, 604; 123/179 SE, 192 R, 192 B, 195 HC

[56] References Cited

U.S. PATENT DOCUMENTS

| | | | |
|---|---|---|---|
| 2,047,420 | 7/1936 | Lee | 74/603 |
| 3,402,707 | 9/1968 | Heron | 123/192 B |
| 3,415,237 | 12/1968 | Harkness | 74/604 |
| 3,457,804 | 7/1969 | Harkness | 74/604 |
| 3,616,786 | 11/1971 | Hatz | 123/192 B |
| 3,626,786 | 12/1971 | Kinoshita et al. | 74/604 |
| 3,643,636 | 2/1972 | Miley et al. | 123/192 B |
| 3,744,342 | 7/1973 | Kinoshita | 74/604 |
| 3,791,227 | 2/1974 | Cherry | 123/192 B |
| 3,942,505 | 3/1976 | Tillotson | 123/179 SE |
| 4,070,971 | 1/1978 | Studebaker | 123/192 B |

FOREIGN PATENT DOCUMENTS

| | | | |
|---|---|---|---|
| 616296 | 7/1935 | Fed. Rep. of Germany | 123/179 SE |
| 381018 | 9/1932 | United Kingdom | |
| 1210249 | 10/1970 | United Kingdom | |

*Primary Examiner*—Lawrence J. Staab

[57] ABSTRACT

A powered device has a center of gravity and includes an engine comprising a block member, a crankshaft having opposite first and second end portions, and generally spaced supports on the block member for supporting the crankshaft for rotation with the first end portion extending toward the center of gravity and the second end portion extending beyond the supports. A piston is located in the block member for reciprocative movement, and a connecting rod has a first end portion pivotally connected with the piston and a rotationally balanced second end portion rotationally connected with the crankshaft intermediate the supports for converting the reciprocative movement of the piston into rotation of the crankshaft about its axis. The engine includes a counterweight on the crankshaft adjacent to the second end portion of the crankshaft for generating an offsetting foce during piston reciprocation to reduce vibration axially along the reciprocative axis of the piston and rotationally about an axis which extends through the center of gravity of the device.

5 Claims, 3 Drawing Figures

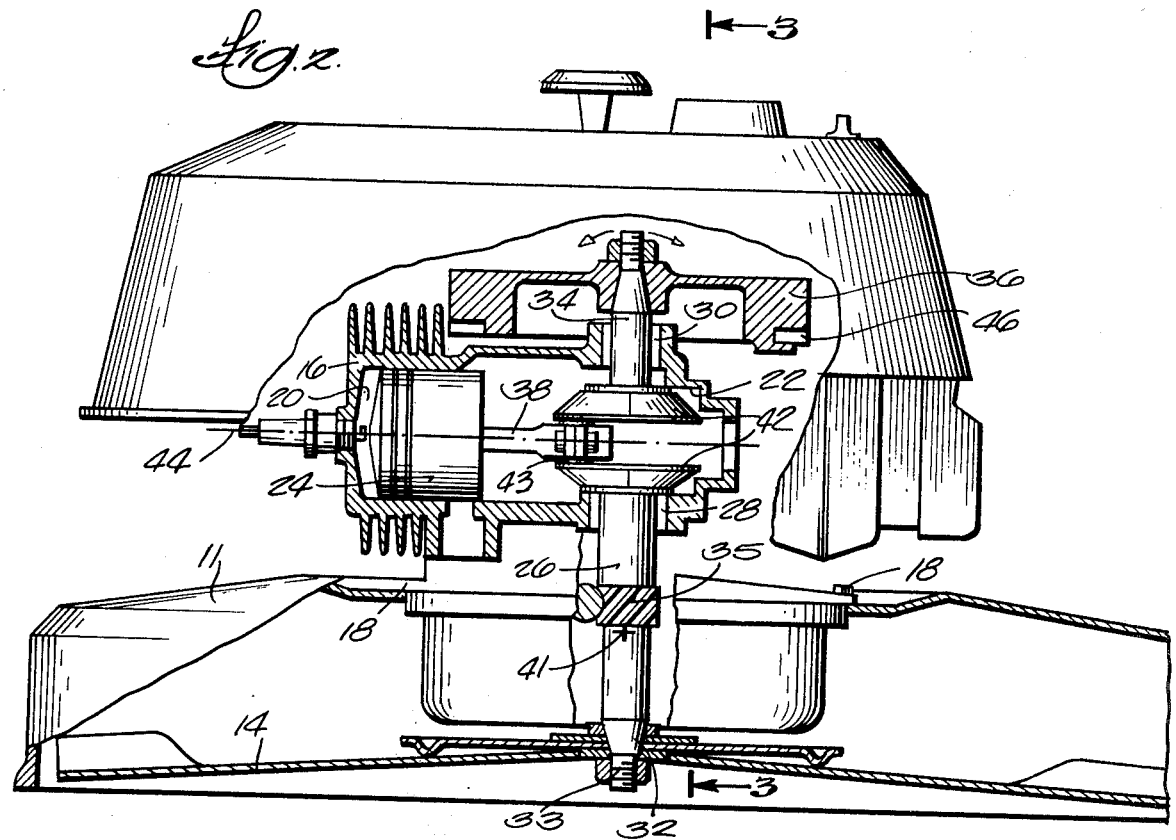
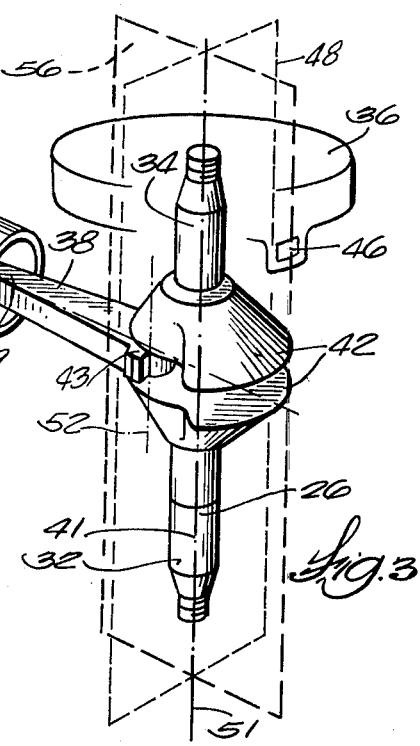
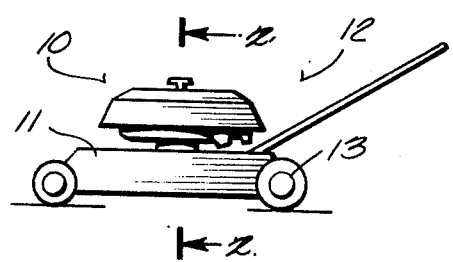

FLYWHEEL OVERBALANCE

FIELD OF THE INVENTION

The invention relates to internal combustion engines and, more particularly, to means for reducing vibration in devices powered by single cylinder internal combustion engines.

DESCRIPTION OF THE PRIOR ART

Attention is directed to the following United States Patents which concern the reduction of vibration in internal combustion engines:
Heron—U.S. Pat. No. 3,402,707—Sept. 24, 1968
Hatz—U.S. Pat. No. 3,616,786—Nov. 2, 1971
Studebaker—4,070,971—Jan. 31, 1978

Attention is also directed to the following British Patents which generally address the same subject matter:
Lienhard—British Pat. No. 381,018—Sept. 29, 1932
Heron—British Pat. No. 1,210,249—Oct. 28, 1970

SUMMARY OF THE INVENTION

The invention provides a powered device having a center of gravity and including an engine comprising a block member, a crankshaft having opposite first and second end portions, and generally spaced support means on the block member for supporting the crankshaft for rotation with the first end portion extending toward the center of gravity and the second end portion extending beyond the support means. A piston is located in the block member for reciprocative movement, and a connecting rod has a first end portion pivotally connected with the piston and a second end portion which is rotationally connected with the crankshaft intermediate the support means for converting the reciprocative movement of the piston into rotation of the crankshaft about its axis. First counterweight means is on the crankshaft adjacent to the rotating second end portion of the connecting rod to rotationally balance the second end portion of the connecting rod. The engine further includes second counterweight means on the crankshaft adjacent to the second end portion of the crankshaft for generating a force in response to piston reciprocation to reduce vibration axially along the reciprocative axis of the piston and rotationally about an axis which extends through the center of gravity of the device.

In accordance with one embodiment of the invention, the second counterweight means has a center of mass which is located in a plane which extends radially of the rotational axis of the crankshaft and which includes the reciprocative axis so as to place the second counterweight means at a position oppositely spaced from the piston axially of the reciprocative axis when the piston is at top dead center.

In accordance with one embodiment of the invention, the piston and the connecting rod have a combined reciprocating mass located at a given radial distance from the rotational axis of the crankshaft, thereby generating a reciprocating force of determinable magnitude in response to piston reciprocation. In this embodiment, the center of mass of the second counterweight means as well as the radial distance of the center of mass from the rotational axis of the crankshaft are preselected so as to generate a force which is less than the reciprocating force. Also in this embodiment, the force generated by the second counterweight means will generate a moment of determinable magnitude about the axis which extends through the center of gravity when the center of mass of the second counterweight means is located in a plane which is at a right angle to the reciprocative axis. Furthermore, the reciprocating force together with the force generated by the second counterweight means will generate a moment of determinable magnitude about the axis which extends through the center of gravity when the piston is at top dead center. In this embodiment, the center of mass of the second counterweight means is located at a preselected distance from the axis which extends through the center of gravity so that the two above described moments will generally equal each other.

In accordance with one embodiment of the invention, the engine further includes a flywheel which is attached to the second end portion of the crankshaft for common rotation therewith, and the second counterweight means is attached to the flywheel.

One of the principal features of the invention is the provision of a device powered by a single cylinder internal combustion engine having a single crankshaft and a reciprocative axis displaced from the center of gravity of the device, in which device overall vibration is reduced by means of a counterweight located at a greater distance from the center of gravity than is the reciprocative axis.

Other features and advantages of the embodiments of the invention will become apparent upon reviewing the following general description, the drawings and the appended claims.

DESCRIPTION OF THE DRAWINGS

FIG. 1 is a diagrammatic view of a rotary lawn motor which has an internal combustion engine which embodies various of the features of the invention;

FIG. 2 is an exploded sectional view of the engine shown if FIG. 1 taken generally along line 2—2 of FIG. 1; and FIG. 3 is a fragmentary perspective view of the engine shown in FIG. 1 taken generally along line 3—3 of FIG. 2.

Before explaining one of the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology being employed herein is for the purpose of description and should not be regarded as limiting.

GENERAL DESCRIPTION

An internal combustion engine 10 is shown in FIG. 1. Although the engine 10 is applicable for use in conjunction with a variety of powered devices, in the illustrated embodiment, the engine 10 is mounted on the chassis or housing 11 of a rotary lawn mower 12 and serves to power the rotary blade assembly 14 thereof as well as power the wheels 13 to propel the lawn mower 12 over the ground.

In this embodiment, and referring now to FIG. 2, the engine 10 includes a block member 16 which is mounted on the chassis 11 of the lawn mower 12 by means of a flange 18 or the like. The block member 16 defines a cylinder 20 and a crankcase 22 which extends from the cylinder 20. A piston 24 is mounted for reciprocative movement inside the cylinder 20.

A crankshaft 26 is supported in the block member 16 for rotation inside the crankcase 22. More particularly, a pair of generally spaced rotary support means 28 and 30, such as needle bearings or the like, are located on opposite sides of the crankcase 22 for rotatably supporting the crankshaft 26. One end portion 32 of the crankshaft 26 extends into the lawn mower chassis 11 and is operatively coupled by means of a bolt 33 to the rotary blade assembly 14 and by means of a gear assembly 35 to the wheels 13. As shown in FIG. 2, the end portion 32 intersects an axis 41 which extends through the center of gravity of the lawn mower 12. The other end portion 34 of the crankshaft 26 extends beyond the uppermost needle bearing 30, and, in the illustrated embodiment, a flywheel 36 is coupled to this end portion 34 for common rotation therewith.

A connecting rod 38 connects the piston 24 with the crankshaft 26 for converting the reciprocative movement of the piston 24 into rotation of the crankshaft 26. More particularly, the connecting rod 38 has a first end portion 39 which is pivotally connected with the piston 24 and a second end portion 43 which is rotationally connected with the crankshaft 26 intermediate the rotary support means 28 and 30. The crankshaft 26 includes a first counterweight 42 or the like which rotationally balances the rotating portion of the connecting rod 38.

The piston 24 and the connecting rod 38 have a combined reciprocating mass which, during piston reciprocation, will generate a reciprocating force of determinable magnitude. This reciprocating force will generally cause the engine 10 and the attached chassis 11 to translate, or "shake", linearly along the reciprocative axis of the piston 24, which axis in the illustrated embodiment lies along the centerline 44 of the piston 24. In addition to this "shaking" motion, since, in the illustrated embodiment, the reciprocative axis 44 is displaced from the center of gravity of the lawn mower 12, the reciprocating force will also generate a moment about the axis 41 which extends through the center of gravity, thereby causing the engine 10 and the attached chassis 11 to rotate, or "rock", in the direction of piston movement (as shown by arrows in FIG. 2). The combined translational and rotational movement occasioned by piston reciprocation manifests itself as vibration which can lead to premature engine wear as well as to the bending of the mounting flange 18.

In order to reduce vibration as just described, a second counterweight 46 is located adjacent to the upper crankshaft end portion 34. In the illustrated embodiment, the second counterweight 46 is located on the peripheral edge of the flywheel 36, such that the center of mass of the second counterweight 46 (see FIG. 3) is generally located in a plane 56 which extends radially of the rotational axis 51 of the crankshaft 26 and which includes the reciprocative axis 44 so as to place the second counterweight 46 at a position oppositely spaced from the piston 24 axially of the reciprocative axis 44 when the piston 24 is at top dead center.

The mass of the second counterweight 46 will itself create a force during piston reciprocation when the second counterweight 46 is disposed in a plane 48 at a right angle to the reciprocative axis 44. This force, being displaced from the center of gravity of the lawn mower 12, will itself create a moment about the axis 41 and contribute to overall vibration. In order to minimize the net overall vibration of the lawn mower 12, the magnitude of the mass of the second counterweight 46, as well as its radial distance from the rotational axis 51 of the crankshaft 32, are preselected so as to generate an offsetting force which is less than the reciprocating force, being ideally equal to one-half of the magnitude of the reciprocating force. Furthermore, the placement of the mass of the second counterweight 46 above the axis 41 is ideally preselected so that the net moment about the axis 41 generated by the combination of the reciprocating force and the offsetting force when the piston 24 is at top dead center will be generally equal to the moment about the axis 41 generated when the mass of the second counterweight 46 is in the plane 48. More particularly, when the force generated by the second counterweight 46 is the ideal value of one-half that of the reciprocating force, the force generated by the second counterweight 46 is then ideally located at $(1+r/l)$ times the distance from the axis 41 as is the reciprocating force, r being the radial distance between the rotational axis 51 of the crankshaft 26 and the rotational axis 52 of the connecting rod 38, and l being the length of the connecting rod 38.

If the second counterweight 46 must be located at a greater distance from the axis 41 than the ideal $(1+r/l)$ times the distance of the reciprocating force from the axis 41, as may be the case when the second counterweight 46 is located on the flywheel 36 (as shown in FIGS. 2 and 3), the magnitude of the offsetting force must be correspondingly reduced from the ideal magnitude of one-half the magnitude of the reciprocating force in order to generally equalize the two moments involved. For example, if the flywheel 36 is located at twice the distance from the axis 41 as the reciprocating force, then the magnitude of the mass of the second counterweight 46 and its radial distance from the rotational axis 51 of the crankshaft 32 are preselected so as to generate an offsetting force which is approximately one-third of the magnitude of the reciprocating force.

The second counterweight 46 positioned as above described has two operative effects. First, the position of the mass of the second counterweight 46 in the plane 56 and opposite from the piston 24 axially of the reciprocative axis 44 when the piston 24 is at top dead center creates the offsetting force which, although limited in value to less than the reciprocating force, nevertheless partially opposes the reciprocating force when the piston is at top dead and bottom dead center. The second counterweight 46 thus serves to reduce the overall peak magnitude of the reciprocating force acting linearly along the reciprocative axis 44. This reduces vibration, particularly that caused by translation or "shaking" movement of the engine 10 and attached chassis 11. Second, since the offsetting force generated by the mass of the second counterweight 46 is located at a greater distance above the axis 41 than the reciprocating force, not only does the offsetting force reduce linear translation along the axis 44, but the offsetting force concurrently generates a moment about the axis 41 which opposes the moment which is generated by the reciprocative force acting about the same axis 41. Thus the tendency for rotation about the axis 41 is countered, and overall rotational vibration or "rocking" can be significantly reduced.

It should now be apparent that the placement of the second counterweight 46 in a position oppositely spaced from the piston 24 axially of the reciprocative axis 44 when the piston 24 is at top dead center and while concurrently being located at a greater distance from the center of gravity than the reciprocating mass serves to reduce both translational and rotational movement of the engine 10 and the attached chassis 11 and thereby results in an overall reduction of vibration.

Various of the features of the invention are set forth in the following claims.

We claim:

1. A powered device having a center of gravity and including an engine comprising a block member defining a single cylinder, a crankshaft having opposite first and second end portions, generally spaced support means on said block member for supporting said crankshaft for rotation with said first end portion extending toward the center of gravity and said second end portion extending beyond said support means, a piston located in said block member for reciprocative movement, a connecting rod having a first end portion pivotally connected with said piston and a second end portion rotationally connected with said crankshaft intermediate said support means for converting reciprocative movement of said piston into rotation of said crankshaft about its axis, first counterweight means on said crankshaft adjacent to said second end portion of said connecting rod for rotationally balancing said second end portion of said connecting rod, and second counterweight means on said crankshaft adjacent to said second end of said crankshaft for generating a force in response to piston reciprocation to reduce vibration axially along the reciprocative axis of said piston and rotationally about an axis which extends through the center of gravity of said device.

2. A device according to claim 1 and wherein said second counterweight means, has a center of mass which is generally located in a plane extending radially of the rotational axis of said crankshaft and which includes said reciprocative axis so as to place said second counterweight means at a position oppositely spaced from said piston axially of the reciprocative axis when said piston is at top dead center.

3. A device according to claim 2 wherein said piston and said connecting rod have a combined reciprocating mass located at a given radial distance from the rotational axis of said crankshaft, thereby generating a reciprocating force of determinable magnitude in response to piston reciprocation, and wherein said center of mass of said second counterweight means and the radial distance of said center of mass from the rotational axis of said crankshaft are preselected so as to generate a force which is less than the reciprocating force.

4. A device according to claim 3 wherein the force generated by said second counterweight means will generate a moment of determinable magnitude about said axis which extends through the center of gravity when said center of mass of said second counterweight means is located in a plane at a right angle to said reciprocative axis, wherein said reciprocating force together with said force generated by said second counterweight means will generate a moment of determinable magnitude about said axis which extends through the center of gravity when said piston is at top dead center, and wherein said center of mass of said second counterweight is located at a preselected distance from said axis which extends through the center of gravity so that said moment generated when said piston is at top dead center generally equals said moment generated when said second counterweight means is in said plane at a right angle to said reciprocative axis.

5. A device according to claim 1 or 4 wherein said engine further includes a flywheel attached to said second end portion of said crankshaft for common rotation therewith, and wherein said second counterweight means is attached to said flywheel.

* * * * *